US006169368B1

(12) United States Patent
Margetson et al.

(10) Patent No.: US 6,169,368 B1
(45) **Date of Patent: *Jan. 2, 2001**

(54) VISUAL INFORMATION SYSTEMS

(75) Inventors: Guy Edward John Margetson, Withersfield; Thomas Andrew Hedges, Oxon; Roy Wyatt, Nr. Torrington, all of (GB)

(73) Assignee: Adflash Limited, London (GB)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/101,612

(22) PCT Filed: Jan. 10, 1997

(86) PCT No.: PCT/GB97/00096

§ 371 Date: Sep. 14, 1998

§ 102(e) Date: Sep. 14, 1998

(87) PCT Pub. No.: WO97/25703

PCT Pub. Date: Jul. 17, 1997

(30) Foreign Application Priority Data

Jan. 11, 1996 (GB) ..................................... 9600519

(51) Int. Cl.[7] ..................... H05B 37/00; G03B 25/00

(52) U.S. Cl. ..................... 315/76; 315/363; 352/100

(58) Field of Search ..................... 315/160, 161, 315/162, 163, 164, 360, 363, 76, 291; 352/100, 98

(56) References Cited

U.S. PATENT DOCUMENTS 4,383,742 * 5/1983 Brachet et al. ..................... 352/100

FOREIGN PATENT DOCUMENTS 2461140 12/1975 (DE) .
0390749 10/1990 (EP) .
2241813 9/1991 (GB) .

* cited by examiner

*Primary Examiner*—David H. Vu
(74) *Attorney, Agent, or Firm*—Christie, Parker & Hale, LLP

(57) ABSTRACT

A visual information system includes an array of light emitting elements located at the side of a train track. The elements are individually energizable by a controller in response to a predetermined program stored in a memory and representative of a predetermined visual image. The controller causes selected elements to be turned ON and OFF, some repetitively, in a predetermined sequence as dictated by the program with a time span of 0.015 seconds. A sensor activates the controller upon the approach of a train so that a passenger gazing at the array as the train passes will perceive the image apparently extending over an area substantially greater than the area of said array.

15 Claims, 3 Drawing Sheets

VISUAL INFORMATION SYSTEMS

FIELD OF THE INVENTION

The present invention relates to visual information systems.

BACKGROUND OF THE INVENTION

Advertising is often presented in illuminated form consisting of an array of fluorescent lights. Such lights are usually switched on during the hours of darkness. The array occupies the same area as the image presented and consumes relatively large amounts of energy. Such systems are relatively inflexible in as much as the whole array needs to be rebuilt to display another image.

Other arrays of moving images are known in which an array consisting of a plurality of rows and columns of light sources are individually energizable to produce, for example, a moving message. Such arrays have several times more columns of light source than rows. Also, the size of the array is the same size as the image and consequently the wiring of individual light sources to the controlling circuitry and the complexity of the control circuitry are likely to be very costly.

It is an object of the invention to provide an improved visual information system.

SUMMARY OF THE INVENTION

According to the present invention there is provided a visual information system comprising an array consisting of a plurality of individually and selectively energizable light sources arranged in rows and columns, a memory for storing a program representative of a predetermined image, a controller actuatable to control the selection and sequence of energization of the light sources within a predetermined time span in accordance with the predetermined program stored on the memory so that a viewer observing the array and being carried past the array at a predetermined speed will observe immediately following said predetermined time span the predetermined image as an apparently stationary image occupying an area substantially larger than the area of said array.

According to the present invention there is further provided a visual information display system comprising a fiber optic array in which one end of a bundle of optical fibers is arranged so that the ends of the individual fibers at one end of the bundle form a vertically elongate array of rows and columns and the ends of the individual fibers at the opposite end of the bundle are connected to an electro-optical interface unit, and means for supplying electrical signals to the interface unit to cause the array to display a succession of images in sufficiently quick succession that a viewer being carried past the array perceives a single horizontally elongate display consisting of said successive images located side by side.

BRIEF DESCRIPTION OF THE DRAWINGS

Visual information system embodying the invention will now be described, with reference to the accompanying diagrammatic drawings, in which.

DETAILED DESCRIPTION OF THE PREFERRED EMBODIMENTS

Figure 1:
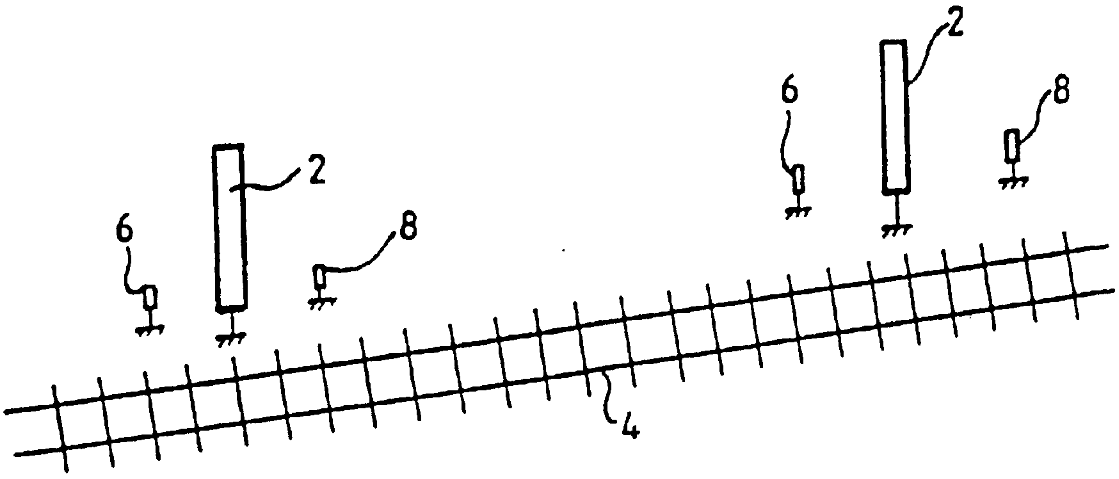
FIG. 1 is a front elevation of the system.

The visual information system to be described is arranged to be located in tunnels through which public transportation vehicles such as tube trains normally run. The system consists of a series of light source arrays 2 arranged at spaced intervals along the track 4 on the side wall of the tunnel, generally level with the windows of the train so that the arrays can be viewed by the passengers in the train. A sensor 6 located upstream of each array 2 is responsive to the approach of the train to the array to actuate the array. Another sensor 8 located downstream of each array is responsive to when the train has passed to deactivate the array 2. The sensors 6 and 8 may take the form of infrared transmitter and receiver pairs.

Each array 2 consists of four columns and sixty four rows of individually and selectively energizable light sources for example light emitting diodes.

Selected light sources in the array are switched ON and OFF by a controller 10 in accordance with a predetermined program stored in a memory 12. The controller is triggered by the sensor 6 and the program is cyclically repeated until a signal is received from the sensor 8.

The switching rate of the light sources and the duration of their energization is such that a passenger sitting in the train and keeping his eyes directed at the array will observe an image several times wider than the width of the array.

The effect is achieved because with light flashes of very short duration, the reaction of the human eye to the flash persists long after the flash has finished. Thus, where a series of very short flashes occur over a short time span less than 0.015 seconds, all the flashes appear to the eye to have occurred at the same time and when the flashes are spaced from one another on the retina because the viewer has moved relative to the array, the eye perceives a composite light pattern which will persist for a short time while immediately following the time span. It will thus be appreciated that a program can be created and stored in the memory 12 which will produce almost any desired image for the observer. The image may take the form of alpha numeric information or may take the form of an advertising poster.

Figure 3:
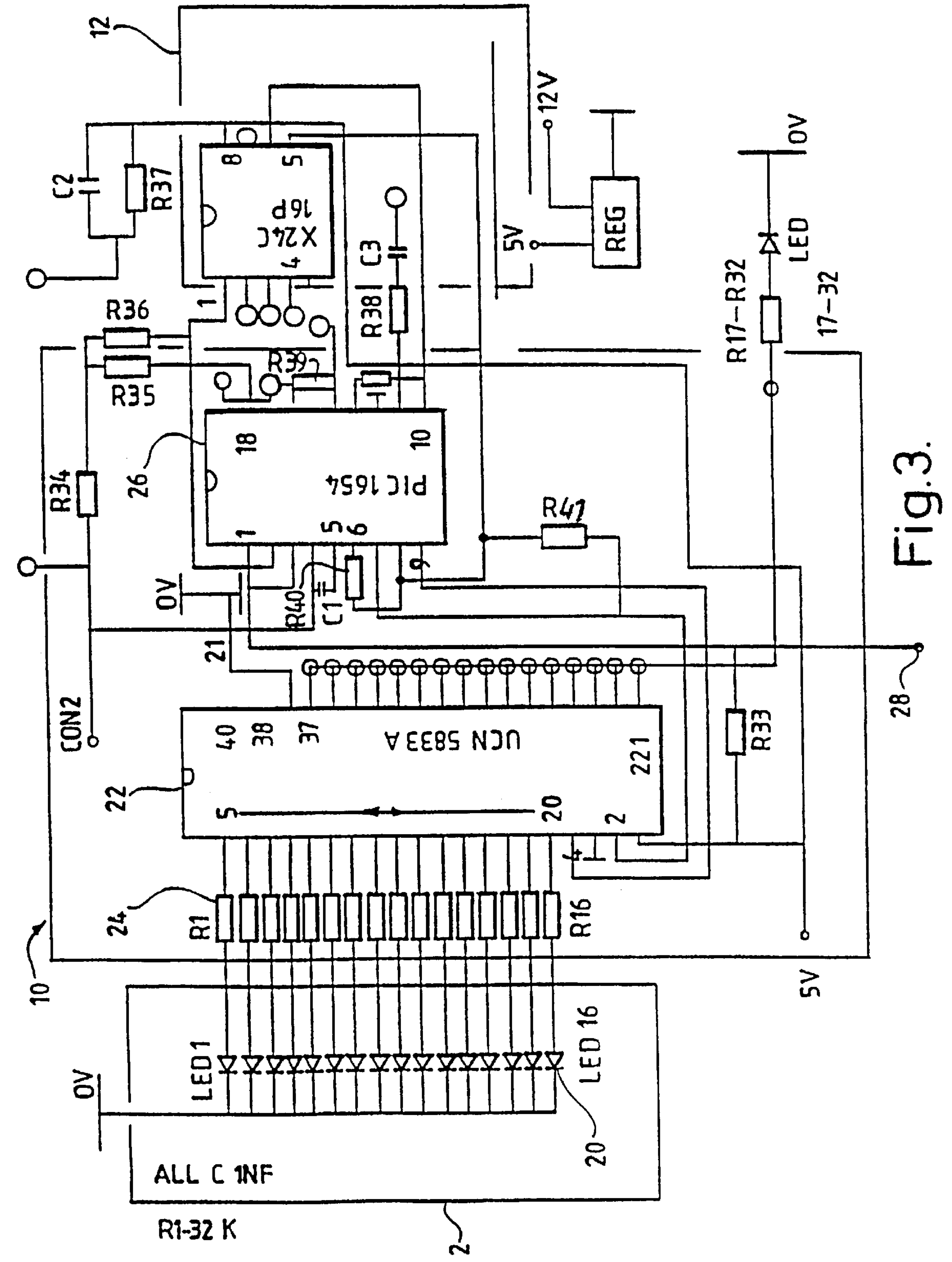
FIG. 3 is a more detailed block diagram of the system.

The block diagram of the system is more clearly shown in FIG. 3.

As can be seen, the array 2 consists of a series of light emitting diodes 20. In this arrangement only sixteen are shown, arranged in a single column. Each LED has a power output of 32 mcd's and has a high switching speed with a switching time faster than 10 nanoseconds.

The controller 10 includes a driver 22 which acts to drive the LED's 20 through respective resistors 24. The driver 22 is controlled by a central processing unit (CPU) 26 which derives its instructions from terminal 1 of the memory 12 via resistors R36 and R34 which feed terminal 5 of the CPU. The memory 12 is in the form of an erasable programmable read only memory (EPROM).

The CPU 26 is triggered into action by a signal received on terminal 28 from the sensor 6.

The CPU cyclically repeats the program stored in the EPROM 12 at a repetition rate in the range of from 10–50 Hz but is preferably 15 Hz.

By updating the memory periodically the passengers will be able to observe different images.

When a large plurality of arrays are provided they can be divided into groups with the memory of the system in each group being updatable simultaneously. A central computer (not shown) is provided to store a plurality of different programs. The central computer is connected to each group to update the memory in each group with a new program depending either upon the time of day or the location of the group.

When a color image is required, each light source of the array can be replaced by a row consisting of red, green and blue elements or a row consisting of red, green, blue and white light elements. Each element is selectively energizable. It will be appreciated that by having the program determine the period of energization of each light source, the shade of color in the final image can be varied as required.

While the rows and columns in each memory can be varied, it is preferable that the ratio of rows to columns in the array is 16:1 or greater.

Figure 2:
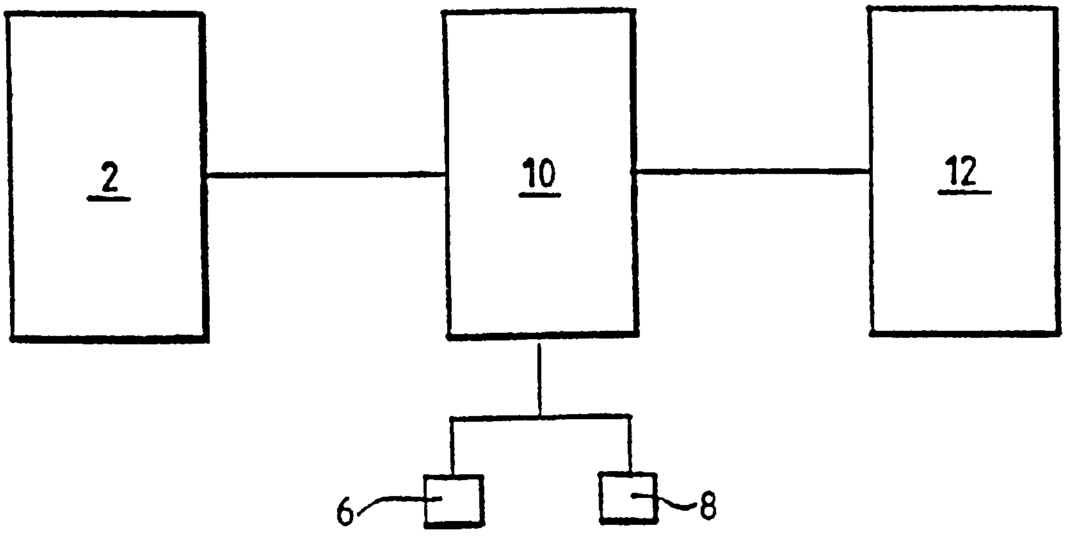
FIG. 2 is a block diagram of the system.
Figure 4:
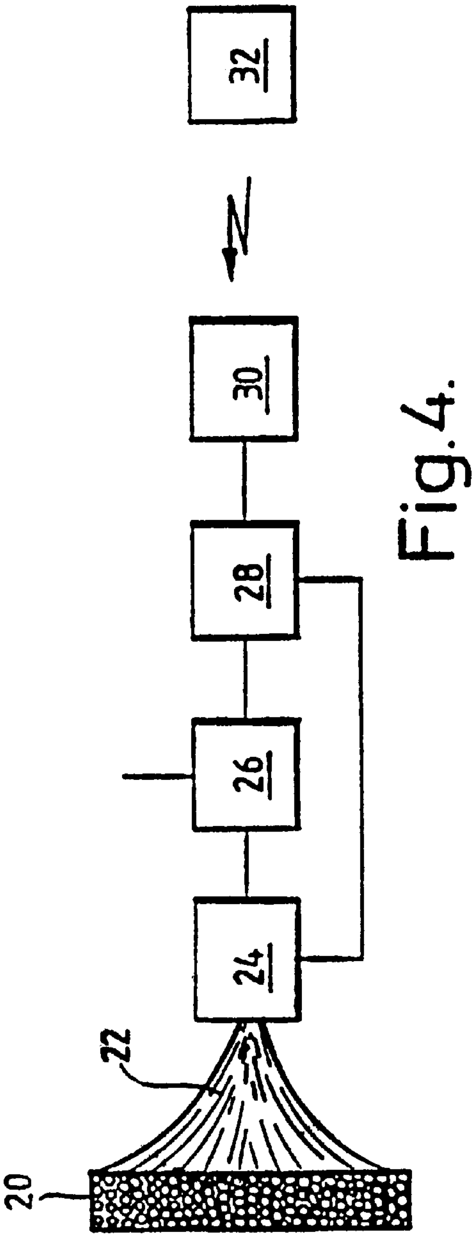
FIG. 4 is a block diagram of another form of system embodying the invention.

In the embodiment shown in FIG. 4, the optical array 20 consists of an array formed by the exposed ends of a bundle 22 of optical fibers. The opposite ends of the electro-optical fibers of the bundle 22 are connected to an electro-optical interface unit 24. Data representative of a desired image to be displayed is transmitted from a central computer 32 by radio optical or direct wire link to a data interface unit 30 which passes the signals to a processor 28 which in turn causes the signals to be stored in a storage unit 26. The processor 28 is responsive to a local trigger such as the sensors 6 and 8 described in connection with FIGS. 1 and 2 or a remote trigger, to cause the electro-optical interface to read out the stored data from the memory 26 and to cause the corresponding image to be progressively reproduced on the display 20 in a manner such as that described in conjunction with FIGS. 1 to 3.

The central computer 32 can be programmed to send different displays to different groups of optical arrays as required and alter the displays stored by the memories 26 at different times of the day, week and/or month.

Figure 5:
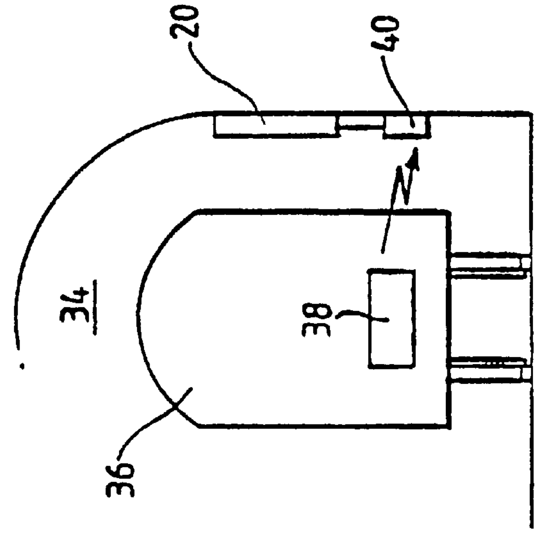
FIG. 5 is an end view of a train passing through a tunnel and illustrating the positioning of the system.

In the embodiment shown in FIG. 5, a train 36 within a tunnel 34 carries an on-board transmitter 38 which is connected to an on-board or a remote central computer 32. Data from the computer 32 is transmitted by the transmitter 38 to a receiver 40 adjacent a display 20 mounted on the wall of the tunnel. The receiver is connected to the data interface 30 (see FIG. 4) of the display from whereon the system operates in the same manner as described in connection with FIG. 4.

The transmitter and receiver may be acoustic, optical or radio. Also, the train may have an on-board speed monitor and data representative of the speed of the train transmitted to the processor 28 so that the processor can modify the rate that the electro-optical interface reads signals from the memory 26 in a manner to synchronize the display with the speed of the train.

In a modification, instead of the interface 24 reading signals from the memory 26, the memory 26 can be omitted and the signals read in real time from the processor 28.

What is claimed is:

1. A visual information system for use in connection with a carrier for carrying observers along a predetermined path, the system comprising an array to be located adjacent said path and consisting of a plurality of individually and selectively energizable light sources arranged in rows and columns, a memory for storing a program representative of a predetermined image, a controller actuatable to control the selection and sequence of energization of the light sources within a predetermined time span corresponding to persistent time of a human retina to light, and in accordance with the predetermined program stored in the memory, a rate of operation of the controller being set to correspond with a speed of the carrier past the array such that an observer carried by the carrier past the array will observe said predetermined image as an apparently stationary image occupying an area substantially larger than the area of said array.

2. A system according to claim 1, including sensing means for monitoring passage of the carrier carrying said observer past the array to actuate said controller.

3. A system according to claim 2, wherein said sensing means comprises infrared sensing means arranged to activate said controller upon approach of said carrier to the array and to deactivate the controller upon departure of said carrier away from said array.

4. A system according to claim 3, wherein the sensing means comprises a first infrared transmitter and receiver pair located upstream of the array and a second infrared receiver and transmitter pair located downstream of the array.

5. A system according to any preceding claim, wherein the controller is arranged to cyclically repeat the energizations specified by the predetermined program at regular intervals.

6. A system according to claim 1, wherein the array consists of light sources of different colors and wherein the predetermined program specifies different durations of energization of the different colored light sources.

7. A system according to claim 1, wherein said controller is arranged to complete one cycle of the predetermined program within a period of 0.015 seconds.

8. A system according to claim 1, wherein a ratio of rows to columns in the array is 16:1 or greater.

9. A system according to claim 1, wherein each light source comprises a light emitting diode and the controller includes a driver for driving each light emitting diode, the driver being arranged to vary a period for which its corresponding diode is energized in accordance with the program stored in the memory.

10. An arrangement comprising a plurality of systems each according to claim 1 and a main computer arranged to store a plurality of different programs, each program representing a respective image, said main computer being operable to replace the program stored in said memories with a program stored in said main computer.

11. An arrangement according to claim 10, wherein said main computer is programmed to replace the program stored in selected ones of the memories in accordance with the time of day.

12. An arrangement according to claim 10 or claim 11, wherein the computer is programmed to replace the program stored in selected ones of the memories in accordance with a location of their associated arrays.

13. A transport system having a path along which carriers can pass and a visual display system located adjacent said path, the display system comprising a fibre optic array in which one end of a bundle of optical fibers is arranged so that ends of the individual fibers form a vertically elongate array of rows and columns and ends of the individual fibers at the opposite end of the bundle are connected to an electro-optical interface unit, control means for supplying electrical signals to the interface unit to cause the array to display a succession of images and means for controlling the rate at which the control means supplies said signals in accordance with a speed of a carrier past the display system, and within a time frame related to a persistent time of a human retina to light, such that an observer on the carrier will perceive apparently simultaneously a single horizontally elongate display consisting of said successive images located side by side.

14. A transport system according to claim 13, wherein the control means includes a computer for generating data representative of a desired display, a local data interface for receiving the data, and a processor for processing the received data and storing it in a memory, the processor being arranged to control the interface unit to respond to the data stored in the memory.

15. A transport system according to claim 14, wherein the carrier is a train, the path is defined by a train tunnel, and the array is mounted on a wall of the train tunnel and further comprising an on-board transmitter on a passing train to transmit the data from the computer to supply the interface unit with said data.

* * * * *

UNITED STATES PATENT AND TRADEMARK OFFICE
CERTIFICATE OF CORRECTION

PATENT NO. : 6,169,368 B1 
DATED : January 2, 2001
INVENTOR(S) : Guy Edward John Margetson, Thomas Andrew Hedges and Roy Wyatt It is certified that error appears in the above-identified patent and that said Letters Patent is hereby corrected as shown below:

Title page,
Item [57], ABSTRACT,
Line 11, after "perceive the" insert -- said --.

Column 3, line 58, through Column 6, line 6,
Delete claims 1-15 in their entirety and insert therefor the following claims:

-- 1. An arrangement comprising a main computer arranged to store a plurality of different programs, each program representing a respective image, and a plurality of visual information systems, each system having:

an array consisting of a plurality of individually and selectively energizable light sources arranged in rows and columns;

a memory for storing a program representative of a predetermined image;

a controller actuatable to control the selection and sequence of energization of the light sources within a predetermined time span in accordance with the predetermined program stored in the memory, so that a viewer observing the array and being carried past the array at a predetermined speed will observe, immediately following said predetermined time span, the predetermined image as an apparently stationary image occupying an area substantially larger than the area of said array; and said main computer being operable to replace the program stored in said memories with one of said different programs stored in said main computer.

-- 2. An arrangement according to claim 1 wherein said main computer is programmed to replace the program stored in selected ones of the memories in accordance with the time of day.

-- 3. An arrangement according to claim 1 or claim 2 wherein the computer is programmed to replace the program stored in selected ones of the memories in accordance with a location of their associated arrays.

UNITED STATES PATENT AND TRADEMARK OFFICE

CERTIFICATE OF CORRECTION

PATENT NO. : 6,169,368 B1 
DATED : January 2, 2001
INVENTOR(S) : Guy Edward John Margetson, Thomas Andrew Hedges and Roy Wyatt It is certified that error appears in the above-identified patent and that said Letters Patent is hereby corrected as shown below:

-- 4. An arrangement according to claim 1 wherein each said system includes sensing means for monitoring the passage of a carrier carrying said viewer past the array to trigger said controller into action.

-- 5. An arrangement according to claim 4 wherein each said sensing means has infrared sensing means arranged to activate said controller upon approach of said carrier to the array and to deactivate the controller upon the departure of said carrier away from said array.

-- 6. An arrangement according to claim 4 wherein each said sensing means comprises a first infrared transmitter and receiver pair located upstream of the array and a second infrared and transmitter pair located downstream of the array.

-- 7. An arrangement according to claim 1 wherein the controller of each said system is arranged to cyclically repeat the energizations specified by the predetermined program at regular intervals.

-- 8. An arrangement according to claim 1 wherein the array of each said system consists of light sources of different colors and wherein the predetermined program specifies different durations of energization of the different colored light sources.

-- 9. An arrangement according to claim 1 wherein the controller of each said system is arranged to complete one cycle of the predetermined programs within a period of 0.015 seconds.

-- 10. An arrangement according to claim 1 wherein the ratio of rows to columns in each said array is 16:1 or greater.

-- 11. An arrangement according to claim 1 wherein in each said system each light source comprises a light emitting diode and the controller includes a driver for driving each light emitting diode, the driver being arranged to vary a period for which its corresponding diode is energized in accordance with the program stored in the memory.

UNITED STATES PATENT AND TRADEMARK OFFICE

CERTIFICATE OF CORRECTION

PATENT NO. : 6,169,368 B1
DATED : January 2, 2001
INVENTOR(S) : Guy Edward John Margetson, Thomas Andrew Hedges and Roy Wyatt It is certified that error appears in the above-identified patent and that said Letters Patent is hereby corrected as shown below:

-- 12. A transport system having a path along which carriers can pass and a visual display system located adjacent said path, the display system comprising a fiber optic array in which one end of a bundle of optical fibers is arranged so that ends of the individual fibers form a vertically elongate array of rows and columns and ends of the individual fibers at the opposite end of the bundle are connected to an electro-optical interface unit, control means for supplying electrical signals to the interface unit to cause the array to display a succession of images and means for controlling the rate at which the control means supplies said signals in accordance with a speed of the carrier past the display system, and within a time frame related to a persistent time of a human retina to light, whereby an observer on the carrier will perceive apparently simultaneously a single horizontally elongate display consisting of said successive images located side by side.

-- 13. A transport system according to claim 12 wherein the control means includes a computer for generating data representative of a desired display, a local data interface for receiving the data, and a processor for processing the received data and storing it in a memory, the processor being arranged to control the interface unit to respond to the data stored in the memory.

-- 14. A transport system according to claim 13 wherein the carrier is a train, the path is defined by a train tunnel, and the array is mounted on a wall of the train tunnel and further comprising an on-board transmitter on a passing train to transmit the data from the computer to supply the interface unit with said data.

-- 15. A transport system having a path along which carriers can pass and a visual display system located adjacent said path, the display system comprising:

a fiber optic array in which one end of a bundle of optical fibers is arranged so that ends of the individual fibers at one end of the bundle form a vertically elongate array of rows and columns and ends of the individual fibers at the opposite end of the bundle are connected to an electro-optical interface unit;

UNITED STATES PATENT AND TRADEMARK OFFICE

CERTIFICATE OF CORRECTION

PATENT NO. : 6,169,368 B1

DATED : January 2, 2001

INVENTOR(S) : Guy Edward John Margetson, Thomas Andrew Hedges and Roy Wyatt

It is certified that error appears in the above-identified patent and that said Letters Patent is hereby corrected as shown below:

a controller supplying electrical signals to the interface unit to cause the array to display a succession of images; and a monitor controlling the rate at which the controller supplies said signals in accordance with a speed of the carrier past the system, and within a time frame related to a reaction time of a human retina to light, whereby an observer on the carrier will perceive apparently simultaneously a single horizontally elongate display consisting of said successive images located side by side. --

Signed and Sealed this

Twelfth Day of November, 2002

*Attest:*

JAMES E. ROGAN

*Attesting Officer* *Director of the United States Patent and Trademark Office*

US006169368C1

(12) EX PARTE REEXAMINATION CERTIFICATE (10325th)

United States Patent

Margetson et al.

(10) Number: US 6,169,368 C1

(45) Certificate Issued: Oct. 14, 2014

(54) VISUAL INFORMATION SYSTEM

(75) Inventors: Guy Edward John Margetson, Withersfield (GB); Thomas Andrew Hedges, Oxon (GB); Roy Wyatt, Nr. Torrington (GB)

(73) Assignee: Spectrum Motion Media Ltd., London (GB)

Reexamination Request:
No. 90/012,089, Jan. 11, 2012

Reexamination Certificate for:

| | |
|---|---|
| Patent No.: | **6,169,368** |
| Issued: | **Jan. 2, 2001** |
| Appl. No.: | **09/101,612** |
| Filed: | **Sep. 14, 1998** |

Certificate of Correction issued Nov. 12, 2002

(21) Appl. No.: 90/012,089

(22) PCT Filed: Jan. 10, 1997

(86) PCT No.: PCT/GB97/00096

§ 371 (c)(1),
(2), (4) Date: Sep. 14, 1998

(87) PCT Pub. No.: WO97/25703

PCT Pub. Date: Jul. 17, 1997

(51) Int. Cl.
*G09F 19/22* (2006.01)

(52) U.S. Cl.
USPC .............................. 315/76; 315/363; 352/100

(58) Field of Classification Search
None
See application file for complete search history.

(56) References Cited

To view the complete listing of prior art documents cited during the proceeding for Reexamination Control Number 90/012,089, please refer to the USPTO's public Patent Application Information Retrieval (PAIR) system under the Display References tab.

*Primary Examiner* — Michael J. Yigdall

(57) ABSTRACT

A visual information system includes an array of light emitting elements located at the side of a train track. The elements are individually energizable by a controller in response to a predetermined program stored in a memory and representative of a predetermined visual image. The controller causes selected elements to be turned ON and OFF, some repetitively, in a predetermined sequence as dictated by the program with a time span of 0.015 seconds. A sensor activates the controller upon the approach of a train so that a passenger gazing at the array as the train passes will perceive the said image apparently extending over an area substantially greater than the area of said array.

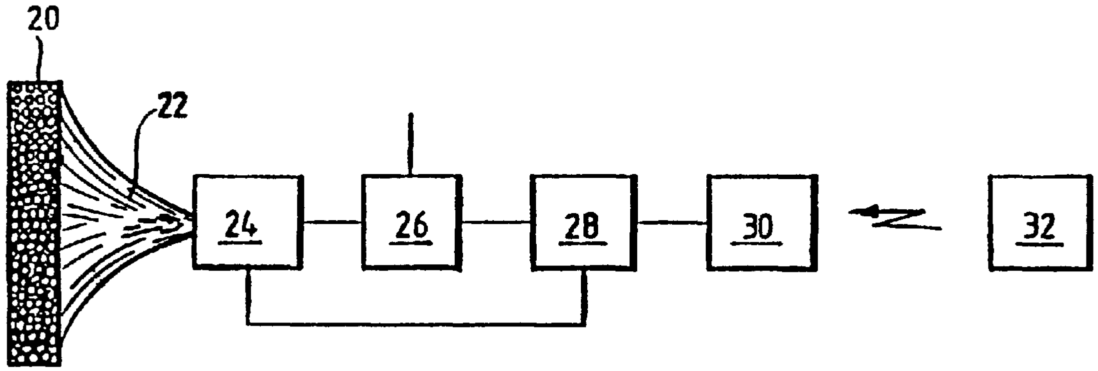

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-11 are cancelled.

Claims 12-15 were not reexamined.

* * * * *